United States Patent Office 3,773,779
Patented Nov. 20, 1973

3,773,779
ANTHRAQUINONE DYESTUFFS
Horst Jager, Leverkusen, Karl-Heinz Schundehutte, Opladen, and Kersten Trautner and Walter Horstmann, Cologne, Germany, assignors to Bayer Aktiengesellschaft, Leverkusen, Germany
No Drawing. Filed Mar. 22, 1971, Ser. No. 126,976
Claims priority, application Germany, Mar. 28, 1970, P 20 14 157.9
Int. Cl. C07d 91/44
U.S. Cl. 260—303          6 Claims

ABSTRACT OF THE DISCLOSURE

Anthraquinone dyestuffs which in the form of the free acid correspond to the formula

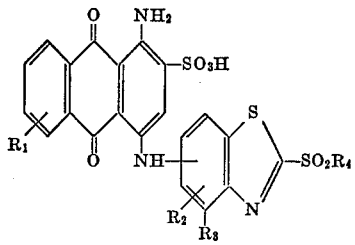

wherein
$R_1$ denotes a hydrogen atom, a hydroxyl group, a halogen atom or a sulpho group,
$R_2$ denotes a hydrogen atom or a substituent,
$R_3$ denotes a hydrogen atom or a sulpho group, and
$R_4$ denotes an optionally substituted alkyl, aralkyl or aryl group, and their use for the dyeing and printing of cellulose-containing materials, such as native and regenerated cellulose. The new dyestuffs are also suitable for dyeing materials containing amide groups, such as wool, silk and synthetic polyamides. Dyeings obtained on cellulose-containing textile materials are distinguished by very good fastness properties, especially fastness to light and to wet processing.

---

The subject of the present invention are new anthraquinone dyestuffs which in the form of the free acid correspond to the formula

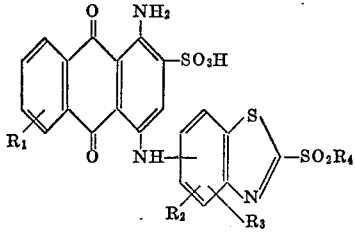

as well as their manufacture and use for dyeing and printing cellulose-containing and nitrogen-containing materials, especially cellulose fibre materials.

In Formula I,
$R_1$ denotes a hydrogen atom, a hydroxyl group, a halogen atom, for example fluorine, chlorine and bromine, or a sulpho group,
$R_2$ denotes a hydrogen atom or a substituent,
$R_3$ denotes a hydrogen atom or a sulpho group and
$R_4$ denotes an optionally substituted alkyl, aralkyl or aryl group.

As examples of substituents $R_2$ there may be mentioned: lower alkyl radicals, for example methyl, ethyl and propyl radicals, lower alkoxy groups, such as methoxy and ethoxy groups, halogen atoms such as fluorine, chlorine and bromine, the carboxyl group or the nitro group.

Suitable substituents $R_4$ are, for example: optionally substituted alkyl groups, especially those with 1–4 C atoms, such as methyl, ethyl, propyl, isopropyl and butyl groups, which can possess substituents such as hydroxyl groups or chlorine atoms.

Further suitable substituents $R_4$ are, for example, aralkyl radicals such as benzyl radicals, which can for example be substituted by lower alkyl or alkoxy groups, and also optionally substituted aryl radicals, especially phenyl radicals, which can possess substituents such as alkyl groups with 1–4 C atoms, nitro groups, halogen radicals, especially chlorine, carboxyl groups or alkoxy groups, especially those with 1–4 C atoms.

Preferred dyestuffs are those of formula

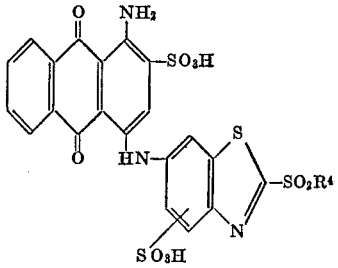

(II)

wherein $R_4$ has the indicated meaning.

The dyestuffs of Formula I are for example manufactured by condensation of anthraquinone compounds of formula

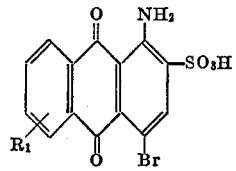

(III)

wherein $R_1$ has the indicated meaning, with amines of formula

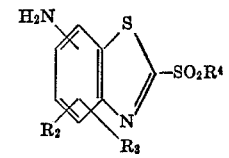

(IV)

wherein $R_2$, $R_3$ and $R_4$ have the indicated meaning.

The reaction is appropriately carried out in the presence of hydrogen bromide-binding agents, such as sodium carbonate, sodium bicarbonate, potassium carbonate, sodium acetate or secondary sodium phosphate, and in the presence of copper or copper compounds, such as copper sulphate, cuprous chloride or copper acetate in an aqueous, aqueous-organic or organic medium, for example in an aqueous-alcoholic or alcoholic medium or in organic solvents which are miscible with water, such as dimethylformamide, dimethylsulphoxide, formamide or dioxane, optionally in the presence of water and of dispersing agents, for example the sodium salt of the condensation product of β-naphthalenesulphonic acid and formaldehyde. Possible alcohols are here especially low molecular alcohols, such as methanol or ethanol.

The reaction already takes place at moderately elevated temperature. It is appropriately carried out at a temperature of 40–100° C., preferably of 40–70° C. In most cases, the reaction is complete within 1–24 hours, A preferred embodiment of the process according to the invention consists of condensing anthraquinone compounds of formula

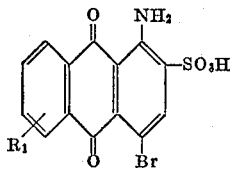

(V)

wherein $R_1$ has the indicated meaning, with amines of formula

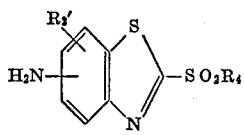

(VI)

wherein $R_2'$ represents hydrogen or a substituent, preferably a lower alkyl or alkoxy group, nitro, halogen or the carboxyl group and $R_4$ has the indicated meaning, and sulphonating the compounds thus obtained, of formula

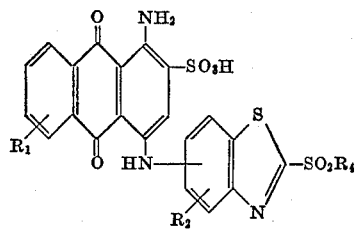

(VII)

to give compounds of Formula VIII:

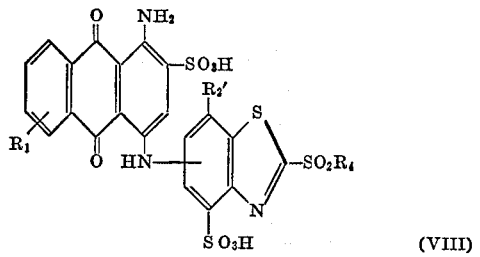

(VIII)

The sulphonation is appropriately carried out in sulphuric acid containing 5-20% of free oleum, at temperatures of about 0-50° C.

Suitable amines of Formula VI are, for example:

2-methylsulphonyl-6-amino-benzthiazole,
2-ethylsulphonyl-6-amino-benzthiazole,
2-n-propylsulphonyl-6-amino-benzthiazole,
2-isopropylsulphonyl-6-amino-benzthiazole,
2-n-butylsulphonyl-6-amino-benzthiazole,
2-phenylsulphonyl-6-amino-benzthiazole,
2-(4'-chlorophenyl)-sulphonyl-6-amino-benzthiazole,
2-(4'-methylphenyl)-sulphonyl-6-amino-benzthiazole,
2-(3'-carboxyphenyl)-sulphonyl-6-amino-benzthiazole,
2-ethylsulphonyl-5-amino-benzthiazole,
2-ethylsulphonyl-5-amino-6-methylbenzthiazole,
2-ethylsulphonyl-7-amino-6-methoxy-benzthiazole,
2-ethylsulphonyl-7-amino-6-methyl-benzthiazole,
2-ethylsulphonyl-5-amino-6-methyl-benzthiazole and
2-methylsulphonyl-7-amino-6-methyl-benzthiazole.

Suitable aminoanthraquinones of formula III are for example 1-amino-2-sulpho-4-brom-, 1-amino-2-sulpho-4-bromo-6- or -7-chloro-, 1-amino-2,5- or -2,6-disulpho-4-brom- and 1-amino-2-sulpho-4-brom-5-hydroxy-anthraquinone, A further process for the manufacture of the dyestuffs (I) consists of condensing anthraquinone compounds of Formula III with an amine of formula

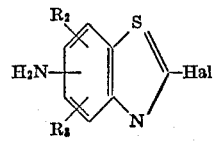

(IX)

wherein $R_2$ and $R_3$ have the indicated meaning and

Hal represents Cl or Br, and reacting the anthraquinone compounds thus obtained, of formula

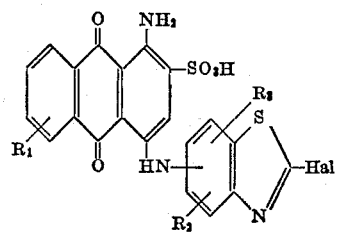

(X)

according to processes which are in themselves known, for example according to the process described in French patent specification 1,432,259, with salts, especially the sodium salts or potassium salts of sulphinic acids of formula $$R_4SO_2H \qquad (XI)$$

This process is appropriately modified in that amines of Formula IX in which $R_3$ denotes hydrogen, are employed, and the anthraquinone compounds obtainable therefrom, of Formula X ($R_3$=hydrogen) are sulphonated, either before or after replacing chlorine or bromine by the sulphonyl radical.

The replacement of bromine or chlorine in (X) by sulphonyl radicals is appropriately carried out in aqueous solution by heating with the sulphinates (XI) in the acid to weakly alkaline range, but preferably in the neutral range.

Suitable amines of Formula IX are, for example, 2-chlor-6-amino-benzthiazole,
2-chlor-6-amino-7-methoxy-benzthiazole,
2-chlor-6-amino-7-methyl-benzthiazole,
2-chlor-6-amino-5-methyl-benzthiazole,
2-chlor-5-amino-6-methyl-benzthiazole and
2-chlor-5-amino-benzthiazole.

Suitable sulphinates are, for example, the sodium or potassium salts of the following sulphinic acids: methanesulphinic acid, ethanesulphinic acid, propanesulphinic acid, butanesulphinic acid, phenylsulphinic acid, 4-chlorophenylsulphinic acid, 4-methylphenylsulphinic acid and 3-carboxyphenylsulphinic acid.

The dyestuffs obtainable according to the process are new. They are outstandingly suitable for use as reactive dyestuffs for dyeing and printing cellulose-containing materials, such as native and regenerated cellulose, according to the techniques known for the purpose, for example according to the cold pad-batch process, pad-steam process and pad-thermofixing process, and for dyeing from a dilute liquor.

The new dyestuffs are also suitable for dyeing materials containing amide groups, such as wool, silk and synthetic polyamides.

On cellulose-containing textile materials, in particular, the new dyestuffs yield extremely valuable prints and dyeings which are distinguished by their strong, mainly greenish-tinged blue colour shades and very good fastness properties, especially fastness to light and to wet processing.

For dyeing cellulose, the dyestuffs are preferably employed in an aqueous solution, to which can be added substances which react alkaline, such as alkali hydroxide or alkali carbonate, or compounds which change into substances which react alkaline, such as alkali bicarbonate or Cl₃C—COONa. Further auxiliary substances can be added to the solution, but these should not react in an undesirable manner with the dyestuffs. Such additives are, for example, surface-active substances, such as alkyl sulphates, or substances which prevent the migration of the dyestuff, or dyeing auxiliaries, such as urea, or inert thickeners, such as oil-water emulsions, tragacanth, starch, alginate or methylcellulose.

The solutions or pastes thus produced are applied to the material to be dyed, for example by padding in a padder (concentrated liquor) or by printing, and are subsequently heated for some time to an elevated temperature, preferably 40 to 150° C. Heating can be carried out in a hot air drying machine, in a streamer apparatus, on heated rollers or by introduction into heated concentrated salt baths, either individually or successively in optional sequence.

When using a padding liquor or dyeing liquor without alkali, the process is followed by a pass of the dry goods through a solution which reacts alkaline and to which sodium chloride or sodium sulphate are added. The addition of salt here reduces the migration of the dyestuff away from the fibre.

It is also possible to pre-treat the material to be dyed with one of the abovementioned acid-binding agents, subsequently to treat it with the solution or paste of the dyestuff, and finally to carry out a fixing process at elevated temperature, as indicated.

For dyeing from a dilute liquor, the goods are introduced into an aqueous solution of the dyestuff (liquor ratio 1:5 to 1:40) at room temperature and are dyed for 40–90 minutes, if necessary raising the temperature to 20–60° C., and with portionwise addition of salt, for example sodium sulphate, followed by the addition of alkali, for example sodium phosphates, sodium carbonate, NaOH or KOH. In the course thereof, the chemical reaction between the dyestuff and fibre occurs. After chemical fixing has taken place, the dyed goods are rinsed hot and finally soaped, in the course of which non-fixed remnants of the dyestuff are removed. Dyeings of excellent fastness, especially fastness to wet processing and to light, are obtained.

In the so-called cold pad-batch process, subsequent heating of the padded fabric can be avoided by storing the fabric for some time, for example 2 to 20 hours, at room temperature. In this process, a stronger alkali is employed than in the dyeing process using a dilute liquor, which has been described above.

To print materials containing hydroxyl groups, a printing paste of the dyestuff solution, a thickener, such as sodium alginate, and a compound which reacts alkaline or splits off alkali on heating, such as sodium carbonate, sodium phosphate, potassium carbonate, potassium acetate, or sodium hydrogen carbonate and potassium hydrogen carbonate, is used, and the printed material is rinsed and soaped.

Textile materials containing amide groups, such as wool, silk, synthetic polyamide fibres and polyurethane fibres are in general dyed in accordance with the dyeing methods customary for the purpose, in the acid to neutral range, a final raising of the pH value of the dyebath, for example to pH 7–pH 9, at times being of advantage.

The after-treatment of the dyeings, impregnations and prints obtained on polyamide fibre fabrics is preferably carried out at a temperature of 50–110° C. and for a period of 5 to 60 minutes.

In the examples which follow, the parts represent parts by weight and the temperatures quoted are degrees centigrade.

EXAMPLE 1

38.2 parts of 1-amino-2-sulpho-4-bromanthraquinone (calculated as free sulphonic acid)—present in the form of the sodium salt—in 800 parts of water are warmed to 70°; the clear solution is treated with 17.4 parts of sodium bicarbonate, 3 parts of Cu(I)Cl and 30 parts of 2-ethyl-sulphonyl-6-aminobenzthiazole. The mixture is warmed under a nitrogen atmosphere to 70° until the initially red solution has become blue. For working up, the solution is cooled, treated with 100 parts of a saturated sodium chloride solution, and adjusted to pH 2. After filtering off and drying, a blue dyestuff powder is obtained, which dissolves in water to give a greenish-tinged blue shade. In the form of the free sulphonic acid, the dyestuff corresponds to the formula

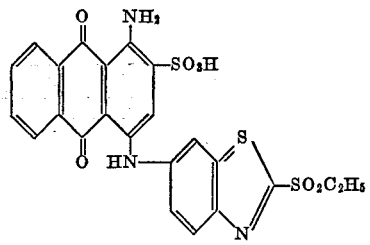

For the sulphonation, 54.3 parts of this compound are introduced into 200 parts of 10% strength oleum, in the course of which the temperature is not allowed to rise above 20°. The mixture is stirred for a further hour at 20° and is poured out onto ice. The dyestuff which precipitates is filtered off and the moist paste is suspended in 1000 parts of ice water and is neutralised by careful addition of dilute sodium hydroxide solution. After clarifying with a filtration aid, 20% by volume sodium chloride are added, and after brief standing the dyestuff is filtered off. After drying, a blue dyestuff powder is obtained, which easily dissolves in water to give a greenish-tinged blue colour. In the form of the free sulphonic acid, the material corresponds to the following composition:

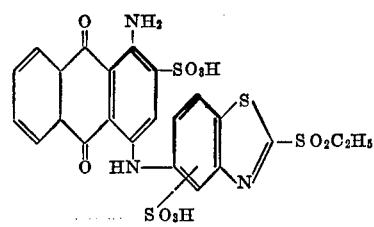

Printing and dyeing process

If a cellulose fabric is printed with a printing paste which per kilogram contains 40 g. of the dyestuff, 100 g. of urea, 500 g. of alginate thickener (60 g. of sodium alginate per kg. of thickener) and 10 g. of sodium carbonate, and which has been made up to 1 kilogram with water, and the fabric is dried, steamed for 8 minutes at 105°, rinsed with hot water and soaped at the boil, a clear greenish-tinged blue print having very good fastness to wet processing and to light is obtained.

An alternative procedure is to impregnate a cotton fabric with a solution at 20–25°, which per litre of liquor contains 20 g. of the above dyestuff and 0.5 of a non-ionic wetting agent (for example a polyoxethylated oleyl alcohol) as well as 150 g. of urea and 15 g. of sodium carbonate, and subsequently to express the fabric between two rubber rollers to a moisture content of approx. 100%. After the intermediate drying at 50–60°, the material is heated to 140° for 10 minutes, and the dyeing thus obtained is thoroughly rinsed with hot water and treated for 20 minutes, at the boil, with a solution which per litre contains 5 g. of Marseilles soap and 2 g. of sodium carbonate. After rinsing and drying, a strong clear greenish-tinged blue dyeing having very good fastness to wet processing, rubbing and light is obtained.

If the instructions of Example 1 are followed, but instead of 2-ethylsulphonyl-6-amino-benzthiazole the equivalent quantity of the amines listed in column A is employed, then, if necessary after sulphonation, the dyestuffs named in column B are obtained, which also yield valuable greenish-tinged blue dyeings in accordance with one of the processes described.

TABLE 1

| Ex. | A | B |
| --- | --- | --- |
| 2 | $H_2N$–benzthiazole–$SO_2CH_3$ | anthraquinone–$NH_2$/$SO_3H$/$HN$–benzthiazole–$SO_2CH_3$ $(SO_3H)_{0\ or\ 1}$ |
| 3 | $H_2N$–benzthiazole–$SO_2$–phenyl | anthraquinone–$NH_2$/$SO_3H$/$HN$–benzthiazole–$SO_2$–phenyl $(SO_3H)_{0\ or\ 1}$ |
| 4 | $H_2N$–benzthiazole–$SO_2$–$CH_2$–$CH_2Cl$ | anthraquinone–$NH_2$/$SO_3H$/$HN$–benzthiazole–$SO_2$–$CH_2$–$CH_2Cl$ $(SO_3H)_{0\ or\ 1}$ |
| 5 | $CH_3O$–benzthiazole($NH_2$)–$SO_2C_2H_5$ | anthraquinone–$NH_2$/$SO_3H$/$OCH_3$/$HN$–benzthiazole–$SO_2C_2H_5$ $(SO_3H)_{0\ or\ 1}$ |
| 6 | $H_2N$–benzthiazole($CH_3$)–$SO_2C_2H_5$ | anthraquinone–$NH_2$/$SO_3H$/$CH_3$/$HN$–benzthiazole–$SO_2C_2H_5$ $(SO_3H)_{0\ or\ 1}$ |

EXAMPLE 7

57 parts of the dyestuff of formula

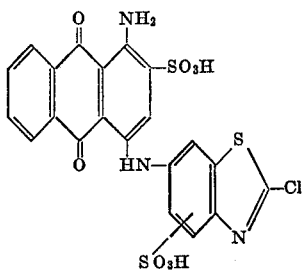

manufactured by reaction of 1 - amino-4-brom-anthraquinone-2-sulphonic acid with 2 - chlor-6-amino-benzthiazole and subsequent sulphonation, are dissolved in 500 parts of water to give a neutral solution. 11 parts of the sodium salt of methanesulphinic acid are added and the clear solution is warmed to 80° for approx. 10 hours. The dyestuff is isolated by salting out. In the form of the free sulphonic acid, it corresponds to the following composition:

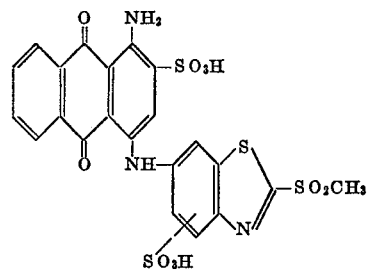

and is identical with the dyestuff described in Example 2.

If the sulphinate used in this example is replaced by the sulphinates mentioned in column A of the table which follows, the reactive dyestuffs listed in column B are obtained, which also yield valuable greenish-tinged blue dyeings.

TABLE 2

| Ex. | A | B |
|---|---|---|
| 8 | $C_2H_5SO_2Na$ | ![structure with $SO_2C_2H_5$] |
| 9 | $CH_3-\langle\rangle-SO_2Na$ | ![structure with $SO_2-\langle\rangle-CH_3$] |
| 10 | ![benzene with $SO_2Na$ and COOH] | ![structure with $SO_2-\langle\rangle-COOH$] |

We claim:
1. Anthraquinone dyestuff which in the form of the free acid corresponds to the formula

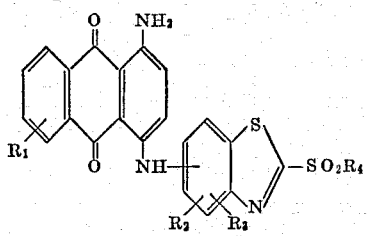

wherein
R₁ denotes hydrogen, hydroxyl, halogen or sulpho;
R₂ denotes hydrogen, alkyl of 1-3 carbon atoms, methoxy, ethoxy, halogen, carboxyl or nitro;
R₃ denotes hydrogen or sulpho; and
R₄ denotes alkyl of 1-4 carbon atoms, alkyl group of 1-4 carbon atoms substituted by hydroxy or chloro, benzyl, benzyl substituted by alkyl of 1-4 carbon atoms or alkoxy of 1-4 carbon atoms, phenyl, phenyl substituted by alkyl of 1-4 carbon atoms, nitro, halogen, carboxyl, or alkoxy of 1-4 carbon atoms.

2. Anthraquinone dyestuff of claim 1 wherein R₁ and R₂ are hydrogen, R₃ is a sulpho group, and R₄ has the same meaning as in claim 1.

3. Anthraquinone dyestuff which in the form of the free acid corresponds to the formula

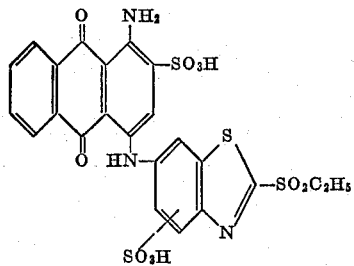

4. Anthraquinone dyestuff which in the form of the free acid corresponds to the formula

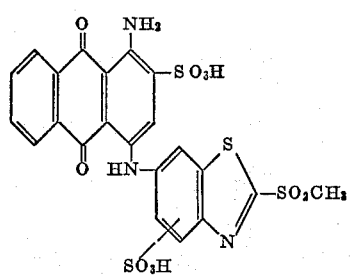

5. Anthraquinone dyestuff which in the form of the free acid corresponds to the formula

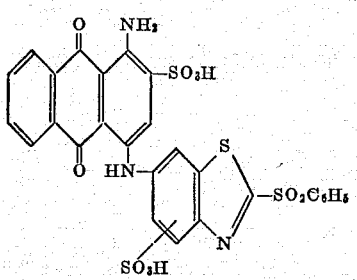

6. Anthraquinone dyestuff which in the form of the free acid corresponds to the formula

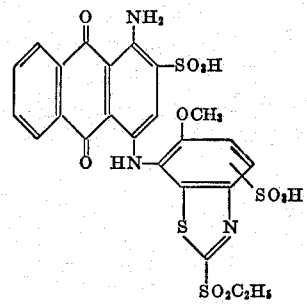

References Cited
UNITED STATES PATENTS
3,299,084   1/1967   Simonnet et al. _____ 260—303
3,468,879   9/1969   Harms et al. _____ 260—303

RICHARD J. GALLAGHER, Primary Examiner

U.S. Cl. X.R.

8—36; 106—204; 260—37, 304, 306